(12) United States Patent
Malin

(10) Patent No.: US 9,386,407 B2
(45) Date of Patent: Jul. 5, 2016

(54) SYSTEMS AND METHODS FOR COMMUNICATING WITH A CONTACT CENTER

(71) Applicant: Good Egg Media LLC, Northbrook, IL (US)

(72) Inventor: Jay I. Malin, Northbrook, IL (US)

(73) Assignee: Good Egg Media LLC, Northbrook, IL (US)

(*) Notice: Subject to any disclaimer, the term of this patent is extended or adjusted under 35 U.S.C. 154(b) by 0 days.

(21) Appl. No.: 14/140,072

(22) Filed: Dec. 24, 2013

(65) Prior Publication Data

US 2014/0179260 A1 Jun. 26, 2014

Related U.S. Application Data

(60) Provisional application No. 61/848,083, filed on Dec. 26, 2012.

(51) Int. Cl.
| | |
|---|---|
| H04M 11/04 | (2006.01) |
| H04W 4/22 | (2009.01) |
| H04W 4/02 | (2009.01) |
| H04W 4/12 | (2009.01) |
| H04M 1/725 | (2006.01) |

(52) U.S. Cl.
CPC *H04W 4/02* (2013.01); *H04W 4/22* (2013.01); *H04M 1/72536* (2013.01); *H04W 4/12* (2013.01)

(58) Field of Classification Search
CPC .......... H04M 3/5116; H04M 2242/04; H04M 2242/30; H04W 4/02; H04W 4/12; H04W 4/14; H04W 4/22; H04W 64/00; H04W 76/007

USPC .......... 455/404.1–404.2, 412.1–412.2, 455/414.1–414.2, 456.1–457; 379/37–51
See application file for complete search history.

(56) References Cited

U.S. PATENT DOCUMENTS

| | | | | |
|---|---|---|---|---|
| 8,046,578 | B1 * | 10/2011 | Trudeau | H04L 63/08 713/154 |
| 2006/0109960 | A1 * | 5/2006 | D'Evelyn et al. | 379/37 |
| 2007/0129014 | A1 * | 6/2007 | Bertorello et al. | 455/41.2 |
| 2009/0197563 | A1 * | 8/2009 | Yasrebi | H04M 3/42357 455/404.1 |
| 2010/0061662 | A1 * | 3/2010 | Hubner | G08B 13/19621 382/305 |
| 2010/0074419 | A1 * | 3/2010 | Poremba | 379/45 |
| 2010/0145947 | A1 * | 6/2010 | Kolman et al. | 707/736 |
| 2010/0174560 | A1 * | 7/2010 | Quan et al. | 705/3 |
| 2010/0261448 | A1 * | 10/2010 | Peters | 455/404.1 |
| 2011/0026440 | A1 * | 2/2011 | Dunn et al. | 370/259 |
| 2011/0064205 | A1 * | 3/2011 | Boni et al. | 379/45 |
| 2011/0130129 | A1 * | 6/2011 | Snyder et al. | 455/414.1 |
| 2012/0184238 | A1 * | 7/2012 | Patel | 455/404.1 |
| 2012/0237002 | A1 * | 9/2012 | Sennett | H04W 4/12 379/45 |
| 2012/0320912 | A1 * | 12/2012 | Estrada | H04M 3/5116 370/389 |
| 2013/0052983 | A1 * | 2/2013 | Fletcher et al. | 455/404.2 |
| 2013/0171958 | A1 * | 7/2013 | Goodson | H04W 4/22 455/404.2 |

* cited by examiner

*Primary Examiner* — Michael Mapa
(74) *Attorney, Agent, or Firm* — Leydig, Voit & Mayer, Ltd.

(57) ABSTRACT

System and methods for communicating with a contact center are disclosed. A method includes: receiving a first message from a user equipment (UE), wherein the first message is received via a first communications protocol; transmitting a second message to a computing device of a contact center, wherein the second message is transmitted via a second communications protocol and optionally includes location information for the UE; and receiving a reply message from the computing device of the contact center.

25 Claims, 15 Drawing Sheets

```xml
<Conversation>
   <ID>148</ID>
   <Phone>
      <Number>2563374027</Number>
      <CarrierId>1</CarrierId>
   </Phone>
   <CreatedOn>2011-05-06 11:28:57 EDT</CreatedOn>
   <Location>
      <Latitude>34.6943911111111</Latitude>
      <Longitude>-86.726585</Longitude>
      <Accuracy>3214</Accuracy>
      <NearestAddress>275 Pineridge Rd, Madison, AL 35758,
   USA</NearestAddress>
    </Location>
    <Messages>
       <Message Index="1">
          <Body>Fire in the building.
            Latitude: 34.6943, Longitude: -86.7265
            275 Pineridge Rd, Madison, AL 35758 +/- 3214m
            OF / PSAP: Huntsville - Madison Co 9-1-1 Ctr</Body>
          <Sender>2563374027</Sender>
          <Recipient>311311</Recipient>
          <ReceivedOn>2011-05-06 11:28:57 EDT</ReceivedOn>
          <DeliveryReasonCode>4</DeliveryReasonCode>
          <Direction>IN</Direction>
       </Message>
       <Message Index="2">
          <Body>Stay where you are.</Body>
          <Sender>202</Sender>
           <Recipient>2563374027</Recipient>
          <ReceivedOn>2011-05-06 11:29:23 EDT</ReceivedOn>
          <DeliveryReasonCode>4</DeliveryReasonCode>
          <Direction>OUT</Direction>
       </Message>
       <Message Index="3">
          <Body>Will do</Body>
          <Sender>2563374027</Sender>
           <Recipient>202</Recipient>
          <ReceivedOn>2011-05-06 11:30:23 EDT</ReceivedOn>
          <DeliveryReasonCode>4</DeliveryReasonCode>
          <Direction>IN</Direction>
       </Message>
    </Messages>
 </Conversation>
```

FIG. 6

```
MESSAGE
sip:5555@10.222.38.218:5060;registering_acc=99_31_115_204;transport=udp
SIP/2.0
From: <sip:3124985501@198.151.61.245>;tag=c901a8c0-13c4-4f578e25-83ee40d-
8c785da
To: <sip:5555@198.151.61.245>
Call-ID: CXC-43-0050563343BB-4f578e25-83ee40b-d45a2a
CSeq: 1 MESSAGE
Via: SIP/2.0/UDP 99.31.115.204:5060;branch=z9hG4bK-30-4f578e25-83ee40d-
68589a0b
Max-Forwards: 70
p-AGENT511-MDN: 3124985501
cellNum: sip:3124985501@99.31.115.204
p-AGENT511-PSAP: Deerfield PD
p-agent511-source-server: http://centos5.dev.a511.net/demo
p-agent511-carrier-id: 5
p-AGENT511-longitude: -87.87
p-AGENT511-carrier: 5
p-AGENT511-accuracy: 3153
p-AGENT511-latitude: 42.15
Content-Type: text/plain
Content-Length: 5 helllo
```

FIG. 8

```
MESSAGE
sip:5555@10.222.38.218:5060;registering_acc=99_31_115_204;transport=udp
SIP/2.0
From: <sip:3124985501@198.151.61.245>;tag=c901a8c0-13c4-4f579586-85bb948-
5ab7d96b
To: <sip:5555@198.151.61.245>
Call-ID: CXC-50-0050563343BB-4f579586-85bb946-d45a44
CSeq: 1 MESSAGE
Via: SIP/2.0/UDP 99.31.115.204:5060;branch=z9hG4bK-37-4f579586-85bb948-
78485cc8
Max-Forwards: 70
p-AGENT511-MDN: 3124985501
cellNum: sip:3124985501@99.31.115.204
p-AGENT511-PSAP: Deerfield PD
p-agent511-source-server: http://centos5.dev.a511.net/demo
p-agent511-carrier-id: 5
p-AGENT511-longitude: -87.87
p-AGENT511-carrier: 5
p-AGENT511-accuracy: 3153
p-AGENT511-latitude: 42.15
Content-Type: text/plain
Content-Length: 34

LATITUDE: 42.15 LONGITUDE: -87.87
Deerfield PD
```

FIG. 9

```
MESSAGE sip:3124985501@198.151.61.245 SIP/2.0
Call-ID: 54931ab16024ec569b3ad74d0bc3db3a@0:0:0:0:0:0:0:0
CSeq: 2049772024 MESSAGE
From: "5555" <sip:5555@99.31.115.204>;tag=2e6bb14a
To: <sip:3124985501@198.151.61.245>
Via: SIP/2.0/UDP 10.222.38.218:5060;branch=z9hG4bK-383532-
c6b02a63db09cceb94bd0dc06b1eb306
Max-Forwards: 70
Content-Type: text/plain
Contact: "5555"
<sip:5555@10.222.38.218:5060;transport=udp;registering_acc=99_31_115_204>
User-Agent: Jitsi1.0-beta1-nightly.build.3820Windows 7
Content-Length: 34

This is the text body
```

FIG. 10

```
MESSAGE
sip:5555@10.222.38.218:5060;registering_acc=99_31_115_204;transport=udp
SIP/2.0
From: <sip:3124985501@198.151.61.245>;tag=c901a8c0-13c4-4f57910b-84a36e6-
5083e733
To: <sip:5555@198.151.61.245>
Call-ID: CXC-48-0050563343BB-4f57910b-84a36e4-d45a3c
CSeq: 1 MESSAGE
Via: SIP/2.0/UDP 99.31.115.204:5060;branch=z9hG4bK-35-4f57910b-84a36e6-
3d0d2af0
Max-Forwards: 70
p-AGENT511-MDN: 3124985501
cellNum: sip:3124985501@99.31.115.204
p-agent511-source-server: http://centos5.dev.a511.net/demo
p-AGENT511-pics:
http://centos5.dev.a511.net/demo/received_files/1331920323237-
ResizedImage_1331920221339.jpg
p-agent511-carrier-id: 5
p-AGENT511-carrier: 5
Content-Type: text/plain
Content-Length: 138

Pictures are available at following locations
http://centos5.dev.a511.net/demo/received_files/1331920323237-
ResizedImage_1331920221339.jpg
```

FIG. 11

```xml
<?xml version="1.0" encoding="UTF-8"?>
 <presence xmlns="urn:ietf:params:xml:ns:pidf"
    xmlns:gp="urn:ietf:params:xml:ns:pidf:geopriv10"
    xmlns:gml="urn:opengis:specification:gml:schema-xsd:feature:v3.0"
    entity="pres:geotarget@example.com">
  <tuple id="sg89ae">
   <status>
    <gp:geopriv>
      <gp:location-info>
        <gml:location>
          <gml:Point gml:id="point1" srsName="epsg:4326">
            <gml:coordinates>37:46:30N 122:25:10W</gml:coordinates>
          </gml:Point>
        </gml:location>
      </gp:location-info>
      <gp:usage-rules>
        <gp:retransmission-allowed>no</gp:retransmission-allowed>
        <gp:retention-expiry>2003-06-23T04:57:29Z</gp:retention-expiry>
      </gp:usage-rules>
    </gp:geopriv>
   </status>
   <timestamp>2003-06-22T20:57:29Z</timestamp>
  </tuple>
 </presence>
```

FIG. 12

SYSTEMS AND METHODS FOR COMMUNICATING WITH A CONTACT CENTER

CROSS REFERENCE TO RELATED APPLICATIONS

This application claims benefit of U.S. provisional patent application Ser. No. 61/848,083, filed on Dec. 26, 2012, which is hereby incorporated by reference in its entirety.

BACKGROUND

Currently, public safety answering points (PSAPs) can only communicate with end users (i.e., people who are in need of assistance) via voice telephone calls. However, this approach is limited in several ways. First, people with hearing or speech disabilities may be unable to acquire assistance via voice telephone calls. Second, people may prefer to use non-voice communications to acquire assistance due to their situation—whether background noise, poor voice communications quality, or an incident such as a hostage scenario where a voice call may not be possible, for example. Lastly, some assistance calls may be better served by non-voice communications such as multimedia and detailed text messages, for example. Also, although PSAPs can accept phone calls from mobile phone users, there are additional complications involved with voice communications between PSAPs and mobile phones.

Accordingly, there remains a need in the art for improved systems and methods for communicating with PSAPs and contact centers in general.

SUMMARY

One embodiment provides a method for communicating with a contact center. The method includes: receiving a first message from a user equipment (UE), wherein the first message is received via a first communications protocol; transmitting a second message to a computing device of a contact center, wherein the second message is transmitted via a second communications protocol and optionally includes location information for the UE; and receiving a reply message from the computing device of the contact center.

Another embodiment provides a computing device at a contact center. The computing device includes: one or more memories storing a non-voice communication application; one or more processors configured to execute the non-voice communication application; and a display device configured to display a chat window associated with the non-voice communication application, wherein the computing device is configured to: receive a first message from a server computing device, wherein the first message optionally includes location information of a user equipment (UE), wherein the first message is received via a first communications protocol, and wherein the server computing device previously received an initial message from the UE corresponding to the first message via a second communications protocol, display an alert in the chat window on the display device associated with the first message, and transmit a second message to the server computing device via the first communications protocol.

Yet another embodiment provides a user equipment (UE), which includes: a wireless communications module configured to transmit a first message to a server computing device, wherein the first message is associated with a first communications protocol, and wherein the server computing device is configured to generate and transmit a second message to a contact center, the second message corresponding to the first message and transmitted via a second communications protocol; a display configured to display a reply message received from the contact center; and a user input interface configured to receive user input of a text-based response to the reply message from the contact center.

BRIEF DESCRIPTION OF THE DRAWINGS

FIG. 6 is an example of a transcript of a non-voice communication between a call taker and an end user, according to an example embodiment.

FIGS. 8-11 illustrate examples of SIP messages, according to embodiments of the disclosure.

FIG. 12 is an example of a SIP message that includes location information and additional call data such as wireless carrier, according to an example embodiment.

DETAILED DESCRIPTION

Current public emergency communications services standards are beginning to address text and multimedia messages, but these additional services are not specifically designed for North America's most popular wireless messaging channels, including short messaging services (SMS) and multimedia messaging services (MMS). Certain standards are predicated on an all-IP (Internet Protocol) access network such as LTE (Long Term Evolution) or WiMAX (Worldwide Interoperability for Microwave Access), and SMS/MMS messages are currently delivered over the SS7 (Signaling System No. 7) wireless phone network.

In some cases, short message service (SMS) text messages are constrained to 160 characters in the United States and are terminated to the Internet by a carrier SMSC (short message service center) gateway via short codes. Commercial codes typically range in length from 4-6 digits and are provisioned by each of the wireless carriers on their respective networks. Likewise, the number "911" must be uniquely provisioned by each wireless carrier. The text control center (TCC) gateway geospatially routes "911" text calls from the wireless phone to the applicable PSAP (public-safety answering point, or public-safety access point) on each respective wireless carrier network.

A current initiative by the FCC (Federal Communications Commission) aims to require wireless carriers to deliver text calls to PSAPs capable of receiving text messages. However, the initiative does not mandate the interface by which PSAP's must receive, display, and transmit text calls. The interface work is being developed by the carriers in ATIS (Alliance for Telecommunications Industry Solutions), and the workflow is being left to CPE (computer-premises equipment) vendors that make the computing systems used at the PSAP. According to various embodiments, PSAPs are able to receive SMS text messages via TTY (teletypewriter), web, or Next-Generation Internet Protocol (IP) interface.

What this means is that each PSAP must carefully select an interface that meets its technical capabilities and capacity. While TTY may be better positioned for a small PSAP, it is unlikely to meet the needs of a large community in which police, fire, an EMT (Emergency Medical Technician) services are separately dispatched and tens of calls are being answered simultaneously. As such, the FCC initiative requires that PSAPs prepare themselves by evaluating their capabilities and needs, selecting platforms capable of processing and displaying text calls, and educating the public.

Figure 1:
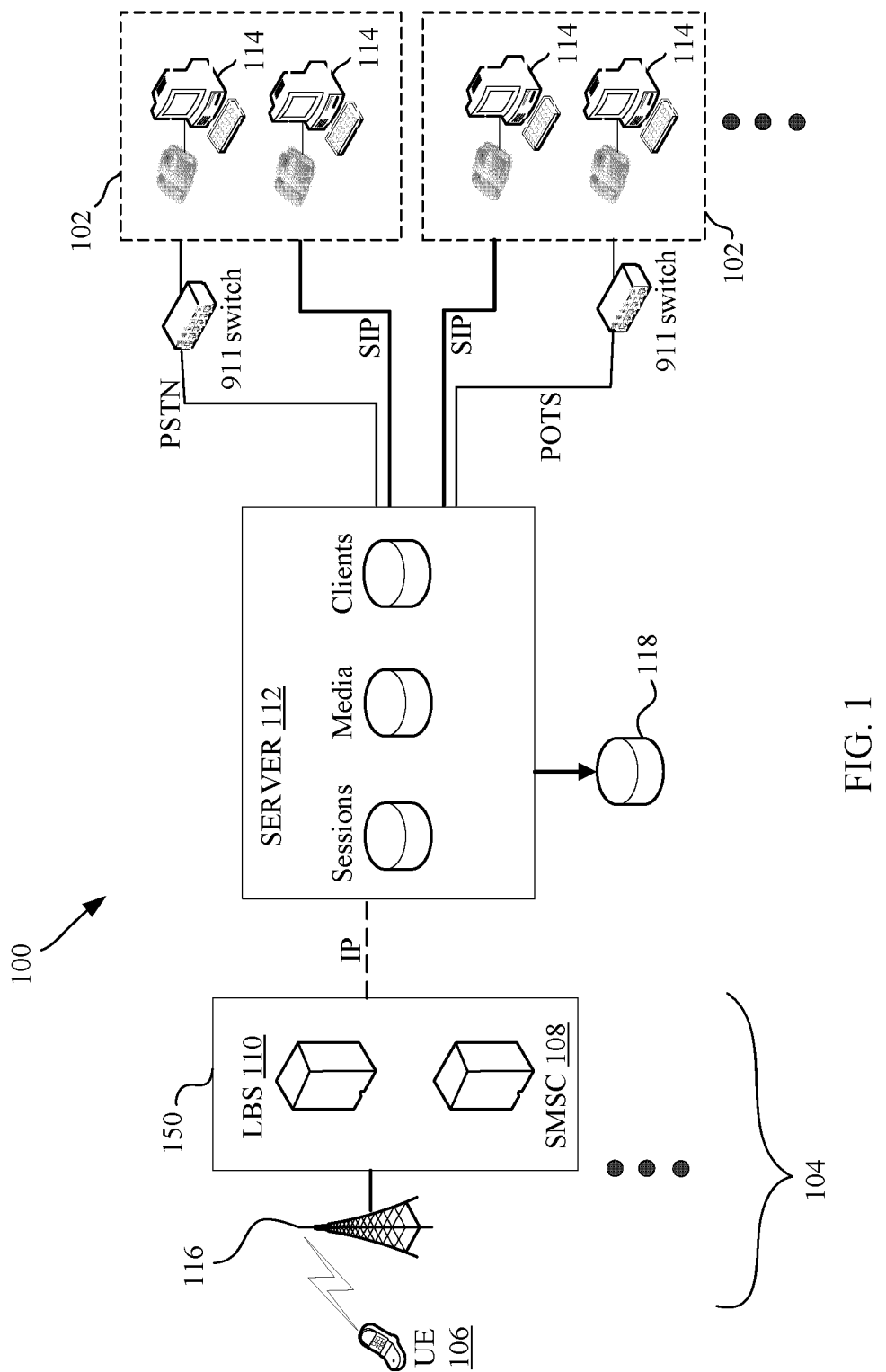
FIG. 1 is a block diagram of an example system for communicating with a contact center, according to an example embodiment.

FIG. 1 is a block diagram of an example system 100 for communicating with a contact center 102, according to an example embodiment. As shown, a User Equipment (UE) 106 is connected to a wireless carrier network 104. The UE 106 can be any type of computing device, including a mobile phone, tablet computer, personal computer, laptop computer, mobile phone with advanced computing capabilities, or any other type of device. The UE 106 includes, among other things, device hardware, software applications, a communications client, output devices (e.g., a display), and input devices (e.g., keyboard, mouse, touch screen), etc. In some embodiments, a UE 106 may act as both an output device and an input device. Device hardware of the UE 106 includes physical computer components, such as a processor and memory.

The wireless carrier network 104, such as a cellular network, includes cellular towers 116, and a text control center (TCC) 150 (e.g., for public safety) including a short messaging service controller (SMSC) 108, and a location based service controller 110. Additional wireless carrier networks may further be included in the system 100.

The UE 106 is configured to communicate with server 112 via the wireless carrier network 104. In some embodiments, the connection between the wireless carrier network 104 and the server 112 is via standards-based Internet Protocol interface technologies such the XML (Extensible Markup Language) protocol, SMPP (Short Message Peer to Peer protocol), REST (Representational State Transfer) protocol, and/or MSRP (Message Session Relay Protocol).

The server 112 includes a software application executed by a processor that is configured to generate messages sent between the UE 106 and a call center 102, as described in greater detail herein. The server 112 is in communication with one or more databases 118. The databases are configured to store data, such as communication logs between the UEs 106 and the contact centers 102. The databases 118 can be any type of database, including relational databases, non-relational databases, file-based databases, and/or non-file-based databases, among others.

In various embodiments, the server 112 may comprise one or more physical or virtual computing devices. The server 112 includes computer servers, databases, application layers, and web servers. The server 112 includes (a) a public switch telephone network (PSTN) connection to contact center 102 for creating automated voice calls, (b) a plain old telephone service (POTS) connection to contact center 102 for creating automated voice calls, and/or (c) a SIP (Session Initiation Protocol) application session controller for communicating with contact center 102. The server 112 may also include a geospatial router, called a location to service translation (LoST) server. The LoST, based upon the location of the cellular device, determines the correct recipient contact center 102 of a communication from the UE 106 and destination Uniform Resource Identifier (URI), as described in greater detail herein. The LoST server may also provide the primary, secondary, and tertiary phone numbers to which the PSTN and/or POTS automated calls generated by server 112 are sent.

Also shown in FIG. 1 are multiple contact centers 102. Each contact center comprises a commercial contact center, command, communications, and control center (C4), or a public safety answering point (PSAP), for example. The contact centers 102 are comprised of one or more live call takers who, upon receipt of an alert, would open an application on a CPE (customer premise equipment) 114 to maintain a communications session with a UE 106. Within the contact center 102, the CPE 114 accepts incoming communications from the server 112 and based upon skills, locations, or other policies, routes the next incoming communications session to a call taker. In some embodiments, some contact centers 102 do not route calls, but the next available call taker picks up a new communications call upon receiving an incoming alert.

Embodiments of the disclosure provide systems and methods for communicating with a contact center 102, for example, an emergency contact center (i.e., a 911 call center). A user of the UE 106 initiates an SMS/MMS message via the wireless carrier network 104. The SMS/MMS message is routed to the server 112. The server 112 then generates and transmits a message to the contact center 102. The message can be a telephone call via PSTN or POTS, or a SIP (Session Initiation Protocol) message. The message may include the wireless phone number, address, or handle of UE 106 in the automatic number identification (ANI) or SIP header that id displayed in CPE 114. SIP is a signaling communications protocol, widely used for controlling multimedia communication sessions such as voice and video calls over IP networks. According to some embodiments for communicating with the contact center 102, the server 112 may generate and transmit a SIP INVITE message.

In some embodiments, the SIP message may include location information for the UE 106, such as a PIDF-LO object (Presence Information Data Format Location Object). In some embodiments, location information may be required for requests for emergency assistance; however, location information may not be required for commercial contact center applications. In some implementations, location information may define to which contact center—PSAP, C4, or commercial—the messages are routed. For example, when communicating with the number "9-1-1," physical handset location may be used as location information. However, for other commercial implementations, the call may be routed based on keyword, handle, or the number communicated with (e.g., text short code or long code). As an example, if a text is sent to a pizza chain restaurant (e.g., by putting my ZIP code or city name in the message), the message may be routed to the closest location of the pizza chain restaurant. Alternatively, texting the city name (e.g., "New York" or handle "@Pizza-NewYork"), the message may be routed to the closest location of the pizza chain restaurant in that city.

In further embodiments, an audio file may be included in the SIP message. The audio file may be informative, such as "you have a text call," or empty. Any other type of file or additional information may also be included in the SIP message. For example, the SIP message may include custom headers denoting what non-voice multimedia/date is being shared.

The SIP message from the server 112 is received by the contact center 102. A call handler at a contact center 102 responds to the SIP message and seeks the next available call taker at the call center 102. For example, the call taker may see on a display of the CPE 114 that the call is a non-voice call and the call taker may be instructed to open an application or browser window on the CPE 114. As an example, the call taker may be asked to open an application with a specialized icon for a non-voice communications application. The wireless phone number displayed in CPE 114 may be derived from the SIP message header or PSTN or POST automatic number identification (ANI) of UE 106.

The non-voice communications application can be directly opened to an interface with the non-voice communication end user (i.e., with the UE 106), such as a key-coded URL (Uniform Resource Locator) with the mobile phone number, handle, or email address, among other things. An example of such a URL is:

http://blabla.net/demo/
admin?vDemo=1&action=1&cellNum=2243925199&clientID=220&identificationKey=v37rs6W1395nZ6212uSP In the example URL, "2243925199" is the mobile phone number of the UE 106, and the "identifcationKey" is a secure code for each call center 102, agent, or position. The "action" field indicates which party initiated the conversation, where "1" may represent that the end user initiated the conversation, and "2" may represent that the call taker initiated the conversation. In some embodiments, the message can be accessible by a call taker at the contact center when the URL is entered into a browser window that includes a mobile phone number of the UE and, in some embodiments, an authentication code identifying the call taker and/or call taking position, where the URL is only accessible on a preconfigured IP (Internet Protocol) address, subnet mask, or private network.

The call taker at the contact center 102 and the end user of the UE 106 may then communicate via messages routed through the server 112. In one example implementation, the messages between the UE 106 and the server 112 are SMS/MMS messages, the messages from the server 112 to the contact center 102 are SIP messages, and the messages from the contact center 102 to the server 112 are IP/HTTP (Hypertext Transfer Protocol) messages or HTTPS (Hypertext Transfer Protocol Secure) messages. Other implementations are also within the scope of embodiments of the disclosure, as described in greater detail herein.

The entire non-voice conversation between the UE 106 and the contact center 102 can be secured by white listing only the IP address and/or subnet mask for the call center 102 or communication recipient (end user). The entire non-voice conversation between the UE 106 and the contact center 102 may be logged by the server 112 as a transcript for record keeping purposes in database 118.

Figure 2:
FIG. 2 is an example of a window in a non-voice communications application of the customer premise equipment (CPE) to query a current conversation via a mobile phone number, device address, or handle, according to an example embodiment.

In the event the aforementioned URL cannot be automatically invoked by the CPE 114 of the call taker, the call taker is directed to a webpage to input the mobile number or handle of the UE 106. This has the same effect as driving the call taker to the non-voice conversation window via URL. FIG. 2 is an example of a window in a non-voice communications application of a CPE to query a current conversation via a mobile phone number, device address, or handle, according to an example embodiment.

When the link is opened via URL or the call taker enters the phone number of the UE 106 manually, the call taker is taken to a chat window in the non-voice communications application where the call taker can maintain communication with the UE 106 or open multimedia, profile data, or the like.

Figure 3:
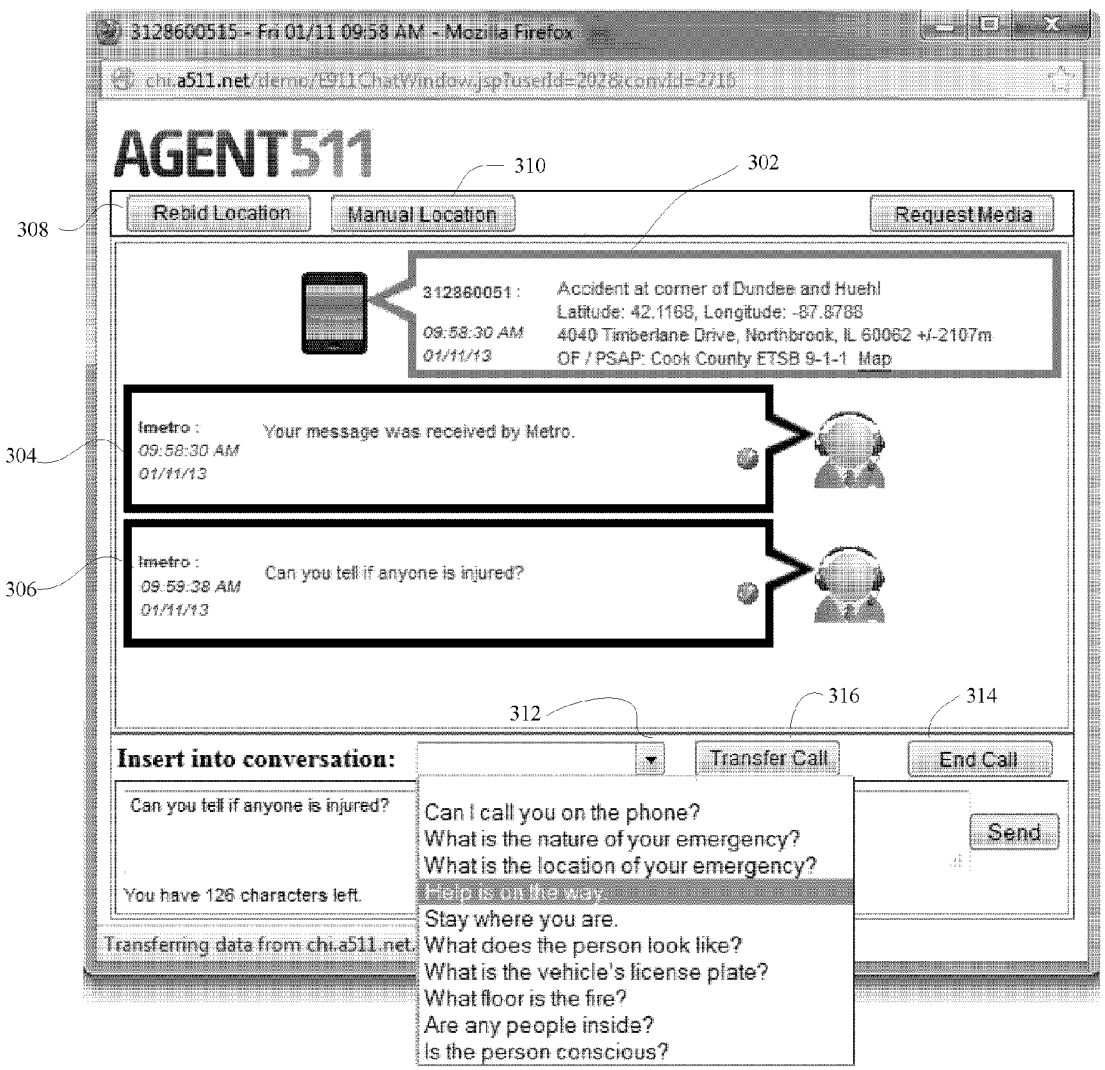
FIG. 3 is an example of a text chat window, according to an example embodiment.

FIG. 3 is an example of a text chat window, according to an example embodiment. The chat window can be displayed in a non-voice communications application on a CPE 114 used by the call taker. The chat window includes communications 302 from the UE and communications 304, 306 to the UE. As shown, the initial communication 302 from the UE includes location information of the UE. The chat window may include a drop-down menu 312 for the call taker to quickly insert commonly used phrases into the non-voice communication.

When a new message arrives from the UE to the call center (via the server 112), the non-voice communications application must notifies the call taker(s) via an alert and/or audible sounds. Next, the call taker opens the chat window that allows the call taker to engage in a continuous non-voice communication (e.g., a text messaging call). What comes next depends on the capability of the CPE platform. For example, the call may be answered by a police department and can be transferred 316 to a fire department. Alternatively, the call taker can automatically send services to the location of the UE. When the non-voice communication ends, the call taker either (a) selects "Release/End Call," or (b) uses the industry-accepted term "End of 911 call." In some embodiments, a button 314 in the user interface may be used to end the non-voice communication.

Other common features of the chat window include location "rebids" 308 and text call backs. As such, as part of the text ESRP (Exchange Solution Reviewed Program) function; the call taker is able to invoke "Rebid Location," which sends a message from the contact center 102 to the server 112 inquiring about an updated location of the UE. If the carrier of the UE supports location information, then the server 112 may query the carrier for updated location information of the UE 106 and forward such information to the contact center. The carrier may return the latitude, longitude, and accuracy. If the location is not returned, or the accuracy=9999 meters (for example, an accuracy of 9999 meters typically occurs on some wireless carrier networks when the cellular tower cannot be correctly determined), the server 112 will attempt to interrogate the carrier two additional times before querying the user for his/her location as previously described. If the carrier of the UE does not supports location information, then the server 112 may query the user of the UE 106.

Figure 4:
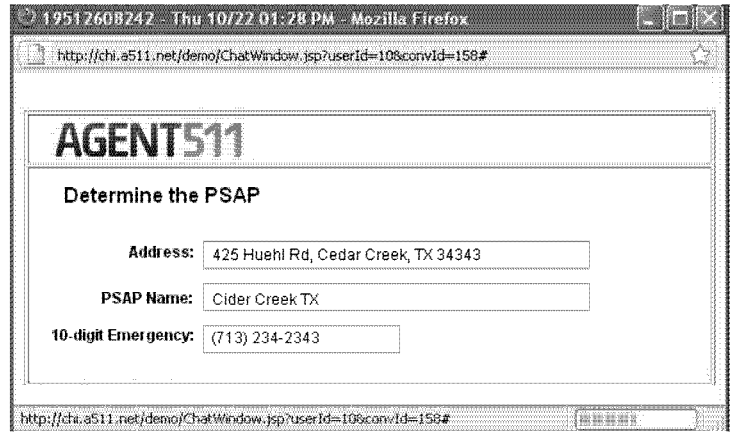
FIG. 4 is an example of a user interface for a call taker to manually input information, according to an example embodiment.

In some embodiments, the call taker can manually input 310 the location of the UE, for example based on the chat history with the UE. In the event the end user manually provides location as part of the non-voice communication, the call taker has the ability to formally add the location to the conversation in the chat window as well as any additional information such as geospatial routing (e.g., PSAP), location of multimedia, or incident identification. FIG. 4 is an example of a user interface for a call taker to manually input information, according to an example embodiment.

In the event the server 112 is either unable to determine the location of the UE or the location is not of a prescribed accuracy, the end user may be automatically asked for their location either in advance of or during the routing of the non-voice communication. A sample query is: "911 needs location. Reply with address as follows. Example: 123 Main St Apt 23 Cider Creek, Tex. If unknown, reply NO." Once the address is acquired the phone may be located and accurately returned.

Figure 5:
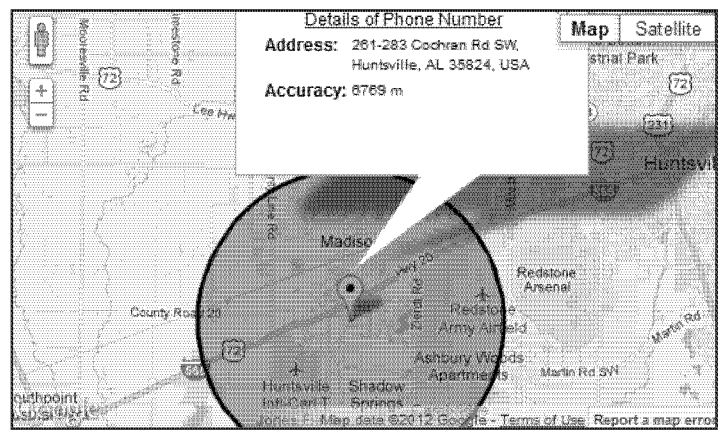
FIG. 5 is an example of a map of a location of an end user with a circle showing accuracy information, according to an example embodiment.

Once location is acquired, the location is displayed on a map on the CPE 114 with a circle showing the accuracy, as shown in FIG. 5. In addition, the approximate address and accuracy are identified in a dialogue box. In some embodiments, location may be queried as part of a SIP call by having the contact center send either a SIP INFO message, a HELD (HTTP-Location Enabled Delivery) message, or sending REBID in the SIP MESSAGE. Upon receipt, the platform queries the carrier or application for the location of the end user.

As described, in some embodiments, the call taker may initiate the non-voice communication (i.e., instead of the non-voice communication being initiated by the UE). This has the impact of creating a new conversation, sending a message, rebidding (acquiring location) a conversation, requesting multimedia, or transferring the conversation. In some embodiments, the call taker has the ability to create a new conversation in the browser or via a URL and manage the conversation without the chat window. The call taker may also initiative the non-voice communication by selecting "Reactivate" in the chat box window for any Archived conversation.

In some embodiments, inside the chat window or via URL, the call taker is able to create and store a session transcript that includes all non-voice messages, system commands, and location updates. The transcript could be immediately downloaded or saved via FTP (File Transfer Protocol) or via other transport method to a specified location, such as database 118.

FIG. 6 is an example of a transcript of a non-voice communication between a call taker and an end user, according to an example embodiment. The transcript is shown in FIG. 5 is XML, however, it may be any other format, including CSV (comma-separated values), Microsoft® Word, PDF (Portable Document Format), or plain text.

In some embodiments, multimedia, such as pictures, video, web pages with profiles, and/or audio files, can be submitted as part of a text conversation either by sharing the media directly via known technique, such as MIME (Multipurpose Internet Mail Extensions) encoding or via URL. A picture that is submitted as part of a non-voice communications is delivered to the contact center via URL, which can be embedded into the initiating SIP INVITE or queried as part of a URL, for example, where action=3 (or other number) within the requesting web service. In this case, the end user will receive an MMS message with a query for a picture. The picture is subsequently delivered by web services, URL, HTTP (Hypertext Transfer Protocol), a SIP message, SIP INVITE, MSRP, or XMPP (Extensible Messaging and Presence Protocol) call, among others.

Figure 7:
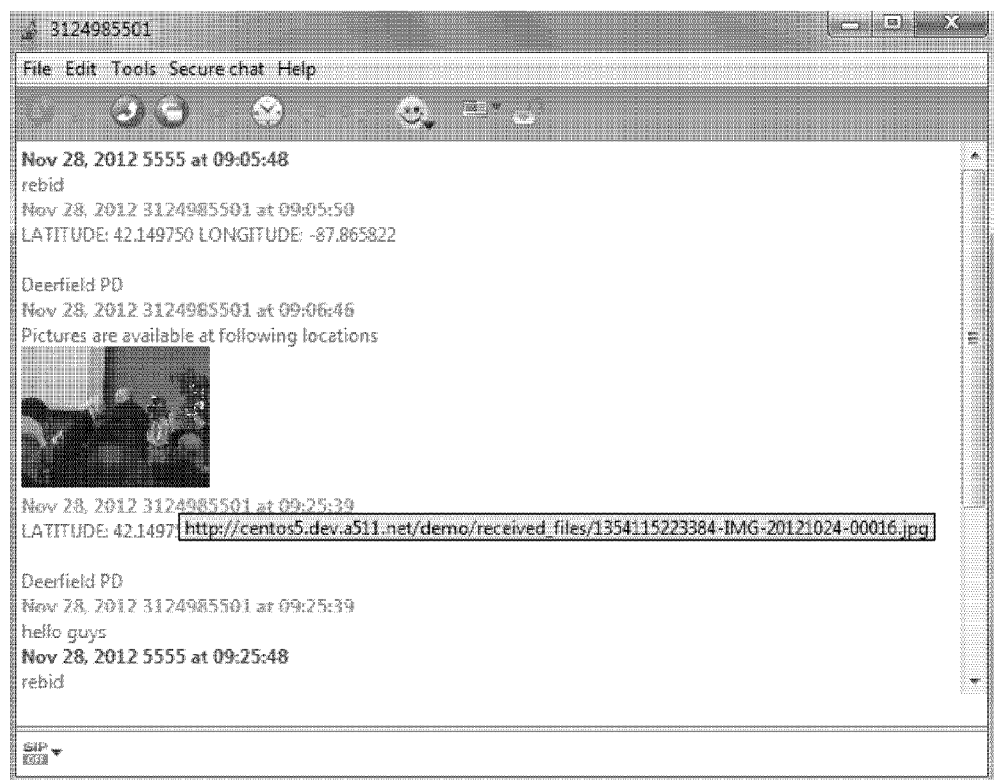
FIG. 7 is an example of a SIP chat dialogue box with a picture embedded into the conversation and the URL for the picture, according to an example embodiment.

FIG. 7 is an example of a SIP chat dialogue box with a picture embedded into the conversation and the URL for the picture, according to an example embodiment. The URL may be secured using IP white listing or by restricting access within a private network.

As described, embodiments of the disclosure offer public safety agencies the ability to bridge the gap between legacy SMS services and i3 (International IP Interconnection) SIP messaging. The embodiments disclosed use the SIP Message Method (SIMPLE) to send/receive messages. Location and pictures are currently embedded in the messages.

In a first use case, "Text to 911," a mobile phone user submits an SMS message to a short code corresponding to the server 112 (or to 911), the location is determined, and a message is geospatially routed to the appropriate PSAP via SIP message.

In a second use case, "Picture to 911," a mobile phone user calls or submits an SMS message or text communication to a PSAP and the PSAP queries the user for a picture message. The picture is submitted via MMS message with picture location embedded into MMS message. In some embodiments, the MMS message may use MSRP (Message Session Relay Protocol).

As described, various types of SIP messages may be submitted from the contact center 102 to the server 112. One example is a "REBID" message, where the contact center 102 requests updated location information. The sever 112 may respond to the contact center 102 with a message such as:

LATITUDE: 42.149 LONGITUDE: −86.865

Northbrook PD

Another example is a "PICS" message, where the contact center 102 requests pictures from the mobile phone user. The sever 112 sends an MMS to the mobile phone user, such as "Please reply with pictures and optional text." When the server 112 receives the picture from the mobile phone user, the server 112 may save the picture in a database, record the URL of the picture, and respond to the call center 102 with the URL of the picture, such as:

http://blabla.net/pics/234sdf34dfwdf_2343.jpg

Another example is an "END OF CALL" message. The call center 102 submits the END OF CALL message to the server 112 and the server 112 sends an SMS to the mobile phone user, such as: "Your SMS session is closed." New calls start a new session.

FIGS. 8-11 illustrate examples of SIP messages, according to embodiments of the disclosure. FIG. 8 represents a mobile-originated SMS with text. FIG. 9 represents a location message, for example, a location message that follows a text message or a response to a REBID message. FIG. 10 represents a mobile-terminated SMS with text. FIG. 11 represents a mobile-originated MMS with a picture, such as a response to a PICS message. The SIP messages shown in FIGS. 8-11 are merely provided as examples and are not limiting.

FIG. 12 is an example of a SIP message that includes location information and additional call data such as wireless carrier, according to an example embodiment. Location is included in the SIP INVITE as a presence information data format location object (PIDF-LO). The PIDF-LO is defined by an XML document that includes coordinates, accuracy, location method, and/or a civic address. This information is used for either geospatial routing (LoST) to the geographically relevant contact center (e.g., PSAP) or a location of the sender's position on a map.

Many peer-to-peer text messaging applications may support foreign language characters. Both English and Non-English text calls, whether using English characters, numbers, special characters, and foreign language characters are within the scope of the disclosure. Most of the popular language translation services do not support text calls, however, language detection in the text application helps to determine the language so the call can be routed to a multilingual call taker, relayed, or refused the call as per the PSAP's policies. Automated language translation, while neither perfect nor ideal, may be performed under some circumstances.

As described, in some embodiments pictures may be solicited as part of either a voice or text call. This is accomplished by integrating "Acquire Media" on the call taker's console or via a PICS command. The solicited MMS work flow is as follows: the wireless user receives an SMS/MMS message, "Reply and attach media." The user replies to the MMS message and attaches the media and optional text. Picture and video data is forwarded to the contact center as a URL link to the multimedia, for example in the .JPEG or .3GP formats. The workflow depends on the agency's policies and archival policies. Because pictures are a few hundred kilobytes and video, several megabytes, the archival system must be sized appropriately. In some embodiments, in order to mitigate spam, multimedia data may only be solicited by a call taker; otherwise, the message is blocked.

According to various embodiments, all messages can be delivered securely using encryption, white listing, and dedicated communication links. This mitigates the burden on the PSAP and allows for centralized management of the application's performance and health. This also creates new business models intended to contain the cost on new equipment.

In sum, text and multimedia communication with a contact center creates new communication channels for communities desperately seeking alternatives to voice. Text and multimedia communication offer richer evidentiary data that maximizes situational awareness in the field.

Figure 13:
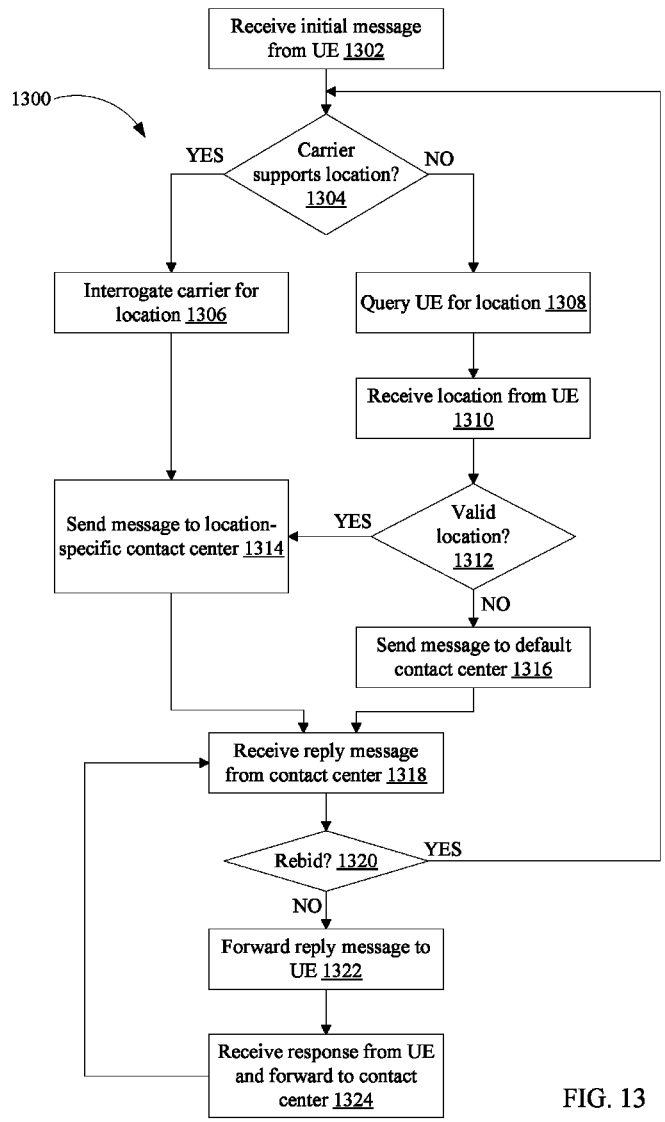
FIG. 13 is a flow diagram of method steps for communicating with a contact center, according to an example embodiment.

FIG. 13 is a flow diagram of method steps for communicating with a contact center, according to an example embodiment. Persons skilled in the art will understand that even though the method 1300 is described in conjunction with the system 100 of FIG. 1, any system configured to perform the method steps is within the scope of embodiments of the disclosure.

As shown, the method 1300 begins at step 1302, where the server, such as sever 112 in FIG. 1, receives an initial message from a UE (user equipment). In one embodiment, the initial message may be an SMS or MMS message received via a wireless carrier network, such as wireless carrier network 104. In other embodiments, the initial message may be any other type of message, including: instant messages, social networking messages, such as Twitter direct messages and Facebook messages, and email, among others.

At step 1304, the server determines whether the carrier of the UE supports location information. If the server determines that the carrier of the UE does support location information, then the method 1300 proceeds to step 1306. At step 1306, the server interrogates the carrier of the UE for location information about the UE. The method 1300 then proceeds to step 1314, described below.

If, at step 1304, the server determines that the carrier of the UE does not support location information, then the method 1300 proceeds to step 1308. At step 1308, the server queries the UE for location information. The query may be in the same format/protocol (e.g., SMS/MMS) as the initial message received from the UE or another format/protocol. At step 1310, the server receives location information from the UE.

At step 1312, the server determines whether the location information received from the UE is valid. If at step 1312 the server determines that the location information is valid, the method 1300 proceeds to step 1314.

At step 1314, the server sends a message to a location-specific contact center. In one embodiment, the message is a SIP message, such as a SIP INVITE message. The message to the location-specific contact center includes embedded location information and/or other information about the UE.

If at step 1312 the server determines that the location information is invalid, the method proceeds to step 1316, where the servers sends a message (e.g., SIP message) to a default contact center and/or contact center position.

At step 1318, the server receives a reply message from contact center. The reply may be in the form of an IP/HTTP message. The reply message may have been typed-in or selected from a listing of pre-typed messages entered by a call taker at the contact center. In some embodiments, in response to receiving an initial message that originated at the UE, the computing device at the contact center automatically sends a return message to the server, which is forwarded to the UE. The return message may include actionable information such as one or more of credentials, a URL link, and a reference to a downloadable client application, which if acted upon by the UE, allows the UE to communicate directly with the contact center, for example, via a second communications protocol, such as real-time video.

Figure 13A:
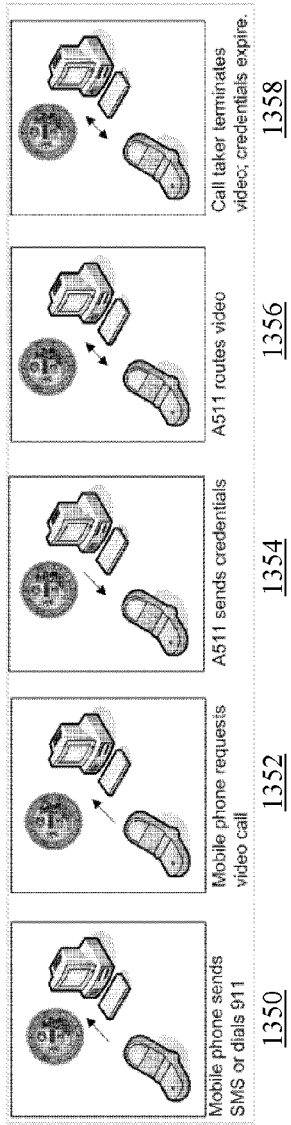
FIGS. 13A-13C illustrate solicited video, according to example embodiments.
Figure 13C:
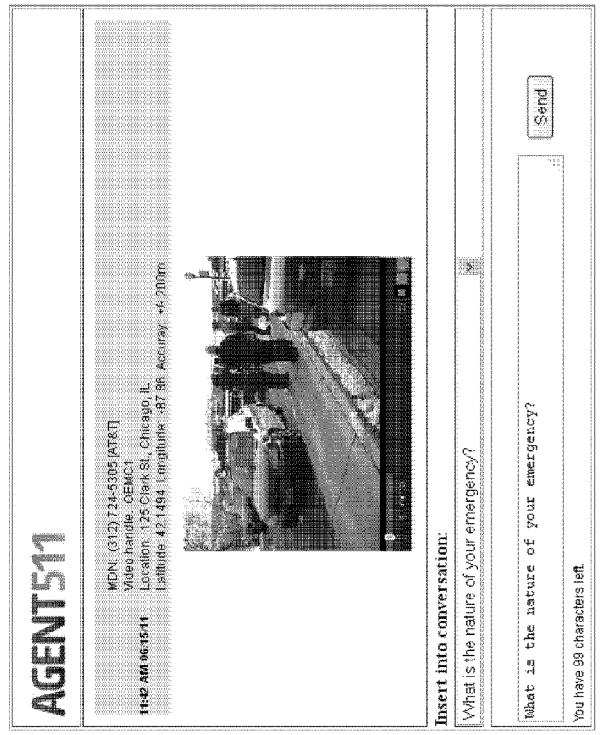
Figure 13B:

FIG. 13A is a conceptual diagram illustrating solicited video, according to an example embodiment. As shown in FIG. 13A, at 1350, a mobile phone sends a text to the contact center or dials 911. At 1352, the mobile phone request video, e.g., by typing in the word "video," as shown in FIG. 13B. At 1354, the contact center sends credentials to the mobile phone. If the credentials are At 1356, video is routed between the mobile device and the contact center. The mobile phone can use an IP-based client application to interact with the call center over video. As described, the video session can be started by having the mobile phone send a text messaging indicated he/she would like to do a real-time video session and one-time credentials are returned to the wireless user. The wireless user inputs the information into his/her wireless client application (e.g., contact center destination/one-time credential) and the session is started with the contact center. At 1358, the contact center terminates the video and/or the credentials expire. FIG. 13C illustrates a conceptual diagram of a communication browser at the contact center that includes the video between the UE and the contact center, as an example.

Referring again to FIG. 13, at step 1320, the server determines whether the reply message from the contact center is a message inquiring about updated location information (e.g., a "REBID" message). If the server determines that the reply message from the contact center is a message inquiring about updated location information, then the method 1300 proceeds to step 1304, described above.

If at step 1320 the server determines that the reply message from the contact center is not a message inquiring about updated location information (i.e., the message is a non-voice communication intended for the UE), then the method 1300 proceeds to step 1322, where the server forwards the reply message to UE. The forwarding of the reply message to the UE may be in the same format/protocol as the initial message received from the UE. In some embodiments, the server may further notify the contact center that the reply message was forwarded to the UE.

At step 1324, the server receives a response from UE and forwards the response to contact center. The method 1300 then returns to step 1318, thereby allowing the contact center and the UE to communicate with one another via the non-voice communication until the communication session is terminated. In one embodiment, the messages transmitted from the server to the UE, and from the UE to the server are transmitted via a first communications protocol; and the messages transmitted from the server to the contact center, and from the contact center to the server are transmitted via a second communications protocol.

Figure 14:
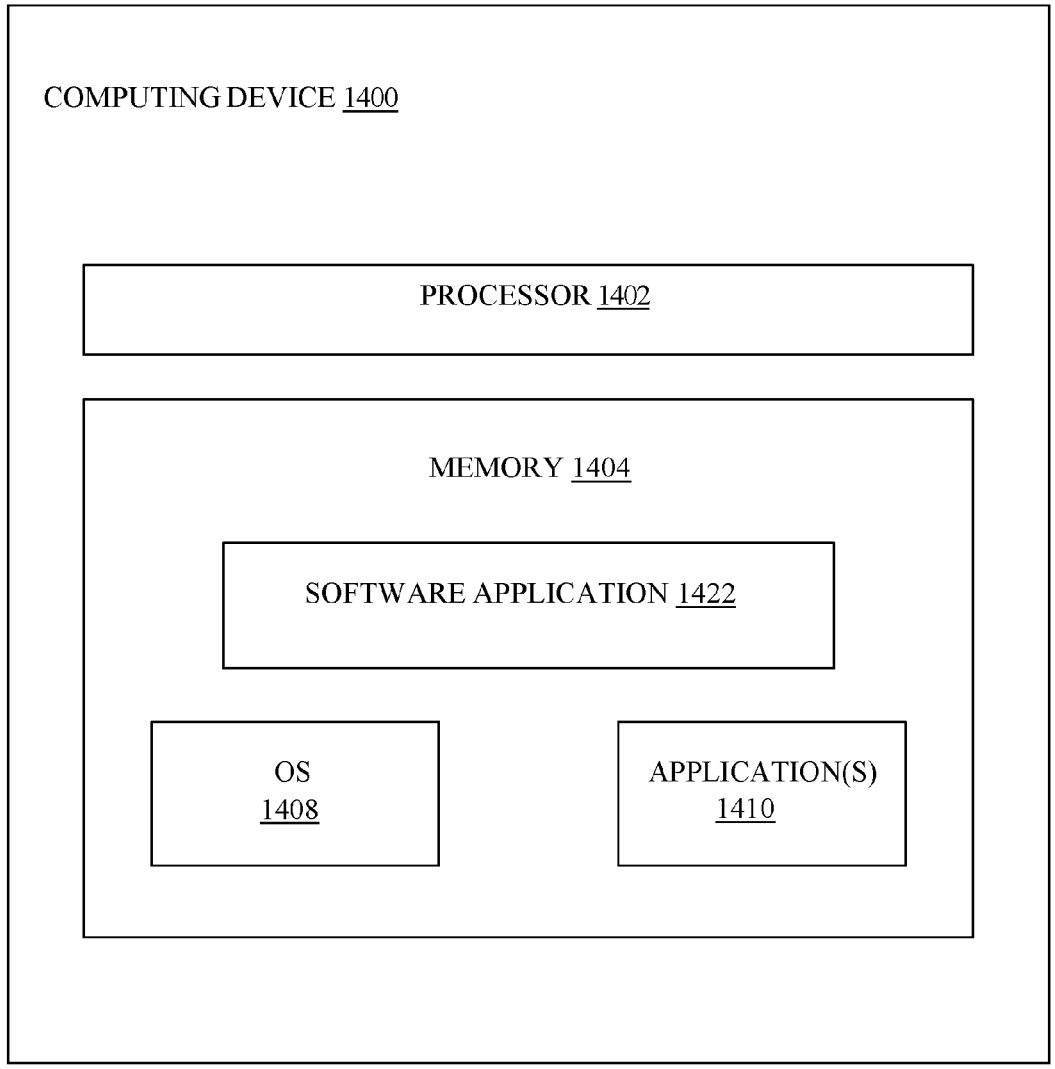
FIG. 14 is a block diagram of the arrangement of components of a computing device configured to query one or more databases, according to an example embodiment.

FIG. 14 is a block diagram of the arrangement of components of an example computing device 1400, according to an example embodiment. The example computing device 1400 shown in FIG. 14 may comprise the UE 106, the server 112, and/or the CPE 114 of the call center 102. As shown, computing device 1400 includes a processor 1402 and memory 1404, among other components (not shown).

The memory 1404 includes various applications that are executed by processor 1402, including installed applications 1410, an operating system 1408, and software application 1422. In embodiments where the computing device 1400 comprises the CPE 114, the software application 1422 comprises a non-voice communication application. In embodiments where the computing device 1400 comprises the server 112, the software application 1422 comprises a software application configured to send and receive messages between a UE 106 and a contact center 102.

Figure 15:
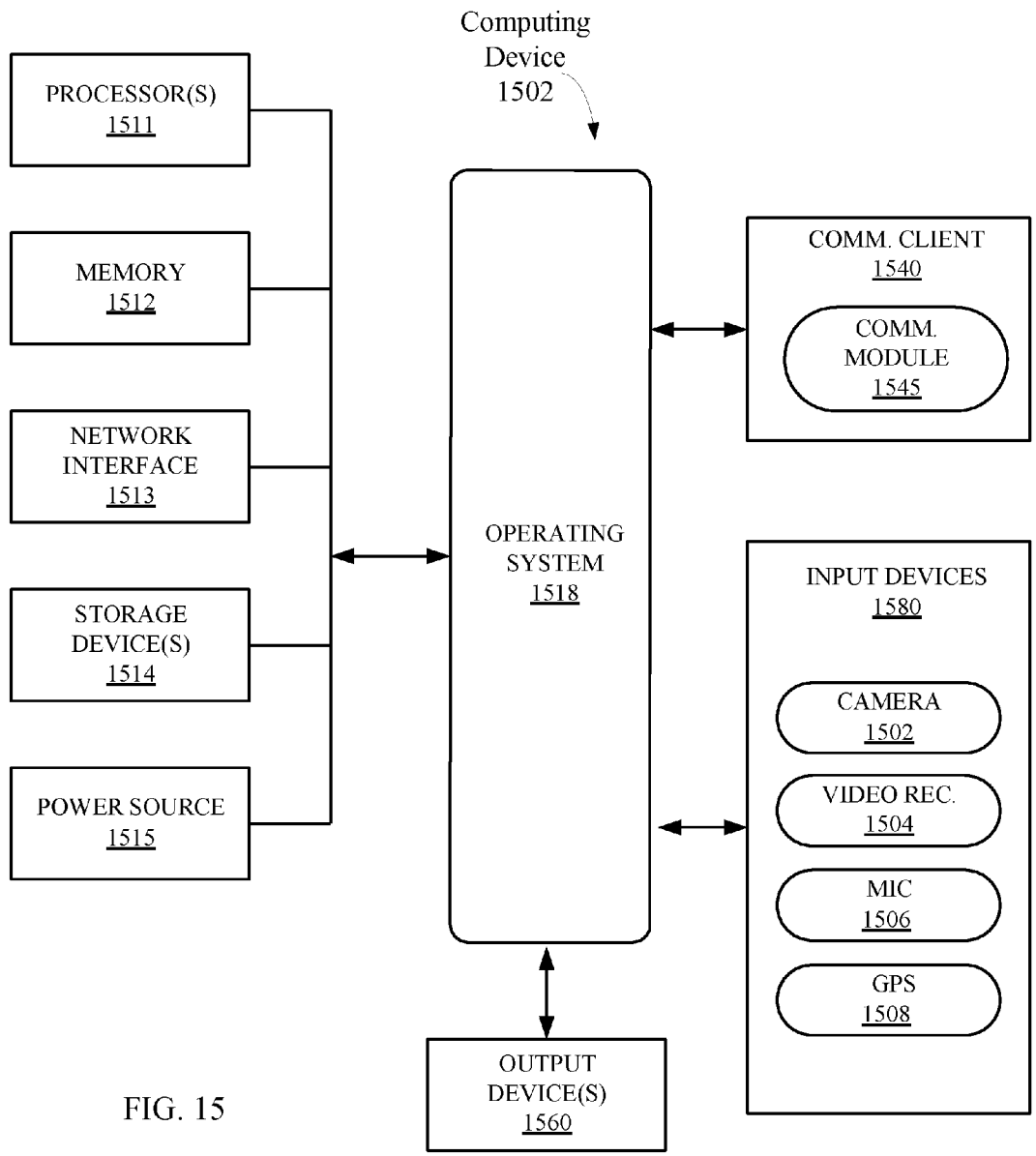
FIG. 15 is a block diagram of example functional components for a computing device, according to one embodiment.

FIG. 15 is a block diagram of example functional components for a computing device 1502, according to one embodiment. The example computing device 1502 shown in FIG. 15 may comprise the UE 106, the server 112, and/or the CPE 114 of the call center 102. One particular example of computing device 1502 is illustrated. Many other embodiments of the computing device 1502 may be used.

In the illustrated embodiment of FIG. 15, the computing device 1502 includes one or more processor(s) 1511, memory 1512, a network interface 1513, one or more storage devices 1514, a power source 1515, output device(s) 1560, and input device(s) 1580. The computing device 1502 also includes an operating system 1518 and a communications client 1540 that are executable by the computing device 1502. Each of components 1511, 1512, 1513, 1514, 1515, 1560, 1580, 1518, and 1540 is interconnected physically, communicatively, and/or operatively for inter-component communications in any operative manner.

As illustrated, processor(s) 1511 are configured to implement functionality and/or process instructions for execution within computing device 1502. For example, processor(s) 1511 execute instructions stored in memory 1512 or instructions stored on storage devices 1514. Memory 1512, which may be a non-transient, computer-readable storage medium, is configured to store information within computing device 1502 during operation. In some embodiments, memory 1512 includes a temporary memory, area for information not to be maintained when the computing device 1502 is turned OFF. Examples of such temporary memory include volatile memories such as random access memories (RAM), dynamic random access memories (DRAM), and static random access memories (SRAM). Memory 1512 maintains program instructions for execution by the processor(s) 1511.

Storage devices 1514 also include one or more non-transient computer-readable storage media. Storage devices 1514 are generally configured to store larger amounts of information than memory 1512. Storage devices 1514 may further be configured for long-term storage of information. In some examples, storage devices 1514 include non-volatile storage elements. Non-limiting examples of non-volatile storage elements include magnetic hard disks, optical discs, floppy discs, flash memories, or forms of electrically programmable memories (EPROM) or electrically erasable and programmable (EEPROM) memories.

The computing device 1502 uses network interface 1513 to communicate with external devices via one or more networks. Network interface 1513 may be a network interface card, such as an Ethernet card, an optical transceiver, a radio frequency transceiver, or any other type of device that can send and receive information. Other non-limiting examples of network interfaces include cellular network interface, wireless network interface, Bluetooth®, 3G and WiFi® radios in mobile computing devices, and USB (Universal Serial Bus), among others. In some embodiments, the computing device 1502 uses network interface 1513 to wirelessly communicate with an external device, a mobile phone of another, or other networked computing device.

The computing device 1502 includes one or more input devices 1580. Input devices 1580 are configured to receive input from a user through tactile, audio, video, or other sensing feedback. Non-limiting examples of input devices 1580 include a presence-sensitive screen, a mouse, a keyboard, a voice responsive system, camera 1502, a video recorder 1504, a microphone 1506, a GPS module 1508, or any other type of device for detecting a command from a user or sensing the environment. In some examples, a presence-sensitive screen includes a touch-sensitive screen.

One or more output devices 1560 are also included in computing device 1502. Output devices 1560 are configured to provide output to a user using tactile, audio, and/or video stimuli. Output devices 1560 may include a display screen (part of the presence-sensitive screen), a sound card, a video graphics adapter card, or any other type of device for converting a signal into an appropriate form understandable to humans or machines. Additional examples of output device 1560 include a speaker, a cathode ray tube (CRT) monitor, a liquid crystal display (LCD), or any other type of device that can generate intelligible output to a user. In some embodiments, a device may act as both an input device and an output device.

The computing device 1502 includes one or more power sources 1515 to provide power to the computing device 1502. Non-limiting examples of power source 1515 include single-use power sources, rechargeable power sources, and/or power sources developed from nickel-cadmium, lithium-ion, or other suitable material.

The computing device 1502 includes an operating system 1518. The operating system 1518 is software stored in a memory and executed by a processor. The operating system 1518 controls operations of the components of the computing device 1502. For example, the operating system 1518 facilitates the interaction of communications client 1540 with processors 1511, memory 1512, network interface 1513, storage device(s) 1514, input device 180, output device 160, and power source 1515.

As also illustrated in FIG. 15, the computing device 1502 includes communications client 1540. Communications client 1540 includes communications module 1545. Each of communications client 1540 and communications module 1545 includes program instructions and/or data that are executable by the computing device 1502. For example, in one embodiment, communications module 1545 includes instructions causing the communications client 1540 executing on the computing device 1502 to perform one or more of the operations and actions described in the present disclosure. In some embodiments, communications client 1540 and/or communications module 1545 form a part of operating system 1518 executing on the computing device 1502.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to retrieve content (i.e., recorded voicemails) from a content server (i.e., a voicemail server). In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as, for example, to a city, ZIP code, or state level), so that a particular location of a user cannot be determined. Thus, the user may have control over how information is collected about him or her and used by the systems discussed herein.

The use of the terms "a" and "an" and "the" and "at least one" and similar referents in the context of describing the disclosed subject matter (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or example language (e.g., "such as") provided herein, is intended merely to better illuminate the disclosed subject matter and does not pose a limitation on the scope of the invention unless otherwise claimed. No language in the specification should be construed as indicating any non-claimed element as essential to the practice of the invention.

One or more embodiments of the disclosure may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

Variations of the embodiments disclosed herein may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method at a server for communicating with a contact center, comprising:
   receiving, by the server, a first message from a user equipment (UE), wherein the first message is received via a first communications protocol, wherein the first communications protocol is a short messaging services (SMS) protocol, a multimedia messaging services (MMS) protocol, an instant messaging protocol, a social network messaging protocol, or email;
   in response to receiving the first message, creating, by the server, an automated telephone call to be placed to a contact center via a second communications protocol, wherein the second communications protocol is via a public switch telephone network (PSTN) or a plain old telephone service (POTS) connection;
   placing, by the server, the automated telephone call to the contact center via the PSTN or POTS connection;
   receiving, by the server, a reply message from a computing device of the contact center via a third communications protocol, wherein the third communications protocol comprises an Internet Protocol (IP) Hypertext Transfer Protocol (HTTP) connection; and
   forwarding, by the server, the reply message to the UE via the first communications protocol, wherein the UE and the contact center communicate with one another via non-voice communication using the first communications protocol between the UE and the server and using the third communications protocol between the server and the contact center, wherein the non-voice communication between the UE and the contact center corresponds to a key-coded URL (Uniform Resource Locator), wherein the key-coded URL includes an identification key associated with the contact center.

2. The method according to claim 1, further comprising determining location information for the UE, wherein communicating with the contract center includes communicating the location information for the UE.

3. The method according to claim 2, wherein the location information includes geographic coordinates for the UE and accuracy information corresponding to the geographic coordinates.

4. The method according to claim 2, wherein a geographic location of the contact center is based on the location information for the UE.

5. The method according to claim 1, wherein the computing device of the contact center is not capable of receiving messages via the first communications protocol.

6. The method according to claim 1, wherein communicating with the contact center causes an alert to be generated at the contact center that alerts an agent of the contact center that a user of the UE has sent a message to the contact center.

7. The method according to claim 1, further comprising send a SIP (Session Initiation Protocol) message to the contact center via the IP network.

8. The method according to claim 7, wherein the SIP message comprises a SIP INVITE message, and location information is embedded in the SIP INVITE message as a Presence Information Data Format Location Object (PIDF-LO).

9. The method according to claim 7, wherein communicating with the contract center includes communicating a wireless phone number for the UE, an address for the UE, or a handle for the UE in an automatic number identification (ANI) or a SIP header.

10. The method according to claim 1, wherein communicating with the contract center includes communicating additional caller data records, including one or more of a name of a user of the UE, an address of the user of the UE, building facilities related to the location information, and any disability of the user of the UE.

11. The method according to claim 1, wherein the reply message from the computing device of the contact center is a location update request message.

12. The method according to claim 11, further comprising, in response to the location update request message, querying a user of the UE for updated location information when a carrier of the UE does not support determining location information.

13. The method according to claim 1, wherein the key-coded URL further includes one or more of a mobile phone number, a handle, and an email address associated with the UE.

14. The method according to claim 1, wherein the non-voice communication is secured by white listing, at the server, one or more of an IP address for the computing device of the contact center and a subnet mask for the computing device of the contact center.

15. The method according to claim 1, wherein the identification key associated with the contact center corresponds to one or more of the contact center, an agent at the contact center, and a position of an agent at the contact center.

16. A server computing device, comprising:
one or more memories storing computer-executable instructions; and
one or more processors configured to execute the instructions in order to:
receive a first message from a user equipment (UE), wherein the first message is received via a first communications protocol, wherein the first communications protocol is a short messaging services (SMS) protocol, a multimedia messaging services (MMS) protocol, an instant messaging protocol, a social network messaging protocol, or email;
in response to receiving the first message, create an automated telephone call to be placed to a contact center via a second communications protocol, wherein the second communications protocol is via a public switch telephone network (PSTN) or a plain old telephone service (POTS) connection;
place the automated telephone call to the contact center via the PSTN or POTS connection;
receive a reply message from a contact center computing device via a third communications protocol, wherein the third communications protocol comprises an Internet Protocol (IP) Hypertext Transfer Protocol (HTTP) connection; and
forward the reply message to the UE via the first communications protocol, wherein the UE and the contact center communicate with one another via non-voice communication using the first communications protocol between the UE and the server computing device and using the third communications protocol between the server computing device and the contact center computing device, wherein the non-voice communication between the UE and the contact center corresponds to a key-coded URL (Uniform Resource Locator), wherein the key-coded URL includes an identification key associated with the contact center.

17. The server computing device according to claim 16, wherein the first message includes location information of the UE.

18. The server computing device according to claim 16, wherein the contact center comprises a commercial contact center, command, communications, and control center (C4) or a public safety answering point (PSAP).

19. The server computing device according to claim 16, wherein the first message includes a mobile phone number, address, or handle of the UE.

20. The server computing device according to claim 16, wherein contents of the first message are accessible by a call taker at the contact center when a URL (Uniform Resource Locator) associated with the first message is entered into a browser window that includes a mobile phone number, address, or handle of the UE and an authentication code identifying the call taker and/or call taking position, wherein the URL is only accessible on a preconfigured IP (Internet Protocol) address, subnet mask, or private network.

21. The server computing device according to claim 16, wherein, in response to receiving the first message, the server computing device is further configured to transmit a return message via the first communications protocol to the UE, wherein the return message includes actionable information including a reference to a downloadable client application, which when acted upon by the UE, allows the UE to communicate with the contact center via the downloadable client application.

22. A user equipment (UE), comprising:
a wireless communications module configured to transmit a first message to a server computing device, wherein the first message is associated with a first communications protocol, wherein the first communications protocol is a short messaging services (SMS) protocol, a multimedia messaging services (MMS) protocol, an instant messaging protocol, a social network messaging protocol, or email, and wherein the server computing device is configured to, in response to receiving the first message, created an automated telephone call to be placed to a contact center via a second communications protocol, wherein the second communications protocol is via a public switch telephone network (PSTN) or a plain old telephone service (POTS) connection, and the server computing device is further configured to place the automated telephone call to the contact center via the PSTN or POTS connection and receive a reply message from a contact center computing device via a third communications protocol, wherein the third communications protocol comprises an Internet Protocol (IP) Hypertext Transfer Protocol (HTTP) connection, wherein the server computing device forwards the reply message to the UE via the first communications protocol;
a display configured to display the reply message received from the contact center; and
a user input interface configured to receive user input of a text-based response to the reply message from the contact center, wherein the UE and the contact center communicate with one another via non-voice communication using the first communications protocol between the UE and the server computing device and using the third communications protocol between the server computing device and the contact center, wherein the non-voice communication between the UE and the contact center corresponds to a key-coded URL (Uniform Resource Locator), wherein the key-coded URL includes an identification key associated with the contact center.

23. The UE according to claim 22, wherein the reply message from the contact center includes request for location information.

24. The UE according to claim 22, wherein the reply message from the contact center includes a request for multimedia information and a UE reply includes multimedia information including pictures or recorded video, and the UE reply is sent to the contact center via SIP (Session Initiation Protocol) or a URL (Uniform Resource Locator) link to the multimedia information.

25. The UE according to claim 22, wherein the reply message from the contact center includes one or more of credentials, a URL (Uniform Resource Locator) link, and client information, which allow the UE and the contact center to communicate via live video.

\* \* \* \* \*